Oct. 6, 1964  P. C. CLARKE  3,151,704
SPRING MOTOR

Filed May 21, 1962  3 Sheets-Sheet 1

INVENTOR.
PHILIP C. CLARKE
BY
*Busser, Smith & Harding*

ATTORNEYS

Oct. 6, 1964

P. C. CLARKE 3,151,704

SPRING MOTOR

Filed May 21, 1962

*INVENTOR.*
PHILIP C. CLARKE
BY

*Busser, Smith & Harding*

ATTORNEYS

Oct. 6, 1964     P. C. CLARKE     3,151,704
SPRING MOTOR

Filed May 21, 1962     3 Sheets-Sheet 3

INVENTOR.
PHILIP C. CLARKE
BY
*Busser, Smith + Harding*

ATTORNEYS

United States Patent Office 3,151,704
Patented Oct. 6, 1964

3,151,704
SPRING MOTOR
Philip C. Clarke, Lansdale, Pa., assignor to Ametek, Inc., New York, N.Y., a corporation of Delaware
Filed May 21, 1962, Ser. No. 196,281
12 Claims. (Cl. 185—37)

This invention relates generally to spring motors and more particularly to motors of the ribbon spring type.

It is known that the so-called B-motor, which has a pair of drums on one of which a ribbon spring is normally coiled and about the other of which the spring is reverse wound, is highly advantageous in providing a long run with a zero or relatively low gradient. In certain applications, in addition to a motor capable of providing long runs at zero or near zero gradient, it is desirable to provide a high starting torque at the beginning of the run down. A typical example would be the motor drive for a spring driven fire alarm. In this example, the designer is faced with the problem of obtaining a long ringing time (of the order of four minutes) while assuring that sufficient power is continuously available to initiate operation of the mechanism gear train which may develop high starting resistance due to congealed lubricants, dust and dirt accumulated over long periods of inactivity. This extra power surge is desirably of the order of 2 to 5 times the normal running torque.

In accordance with this invention the problem of providing a high starting torque has been solved. Further, in accordance with this invention, the run of the B-motor can be further increased. Moreover, both of these marked improvements can be achieved without employing additional space.

The above and other objects and features of the invention will become apparent from a consideration of the following description in conjunction with the accompanying drawings, in which.

Figure 4:
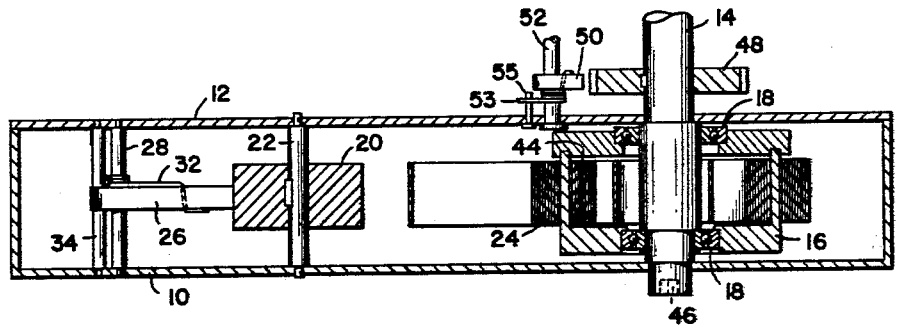
FIGURE 4 is a section taken on line 4—4 in FIGURE 2.

The spring motor illustrated in the drawings comprises a housing consisting of a casing member 10 and a front plate 12. A shaft 14 is mounted for free rotation in opposed side walls of the housing as is shown in FIGURE 4. A hollow drum 16 is mounted on shaft 14 in concentric relationship therewith, a suitable bearing means 18 being positioned between the drum 16 and the shaft 14. The bearing means 18 may be of any type well known in the art, such as ball bearings, roller bearings, etc. Accordingly, drum 16 and shaft 14 are freely rotatable relative to each other. A drum 20 is mounted fixedly on a spindle 22 which is mounted rotatably in the sides of the housing.

Figure 5:
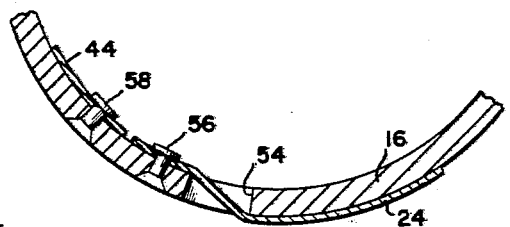
FIGURE 5 is a view illustrating the manner in which the springs are connected to a drum.

A tightly coiled non-cumulative force ribbon spring 24 is normally coiled on storage drum 20 and has one end connected thereto, as by insertion into a slot 25 therein, and has its other end connected to output drum 16 by means of a rivet. One form of connection between spring 24 and drum 16 is shown in FIGURE 5. The spring 24 and its associated drums 16 and 20 form a biaxial spring motor of the type known as a B-motor. In this type of spring motor, the ribbon spring 24 is wound on drum 16 in reverse direction to the winding on the drum 20. This well known type of motor is disclosed in U.S. Patent No. 2,063,799, issued December 8, 1936 and preferably uses tightly coiled non-cumulative force ribbon springs such as those described in U.S. Patent No. 2,609,192, issued September 2, 1952.

When the output drum 16 is rotated, the ribbon spring 24 is progressively transferred from the storage drum 20 to the output drum 16. As this action occurs the spring material is first pulled straight in the zone between the two drums and then bent backwards about the output drum 16. During the angular deflection of the drums only the material passing through the zone between the drums is subject to a change in stress whereby the entire length of material during winding or unwinding is stressed incrementally in a non-cumulative fashion. Thus the B-motor has generally a relatively low or zero gradient.

Provision is made to prevent overtravel in either direction. To this end, a stop 26 is mounted for rotation about a pin 28 mounted on the housing and is cooperable with a notch 30 in the drum 20 to prevent unwinding of the spring 24 from the drum beyond the position illustrated in FIGURE 2. A torsion spring 32 preloaded between a pin 34 and stop 26 serves to bias the stop 26 toward contact with the drum 20. To prevent the complete unwinding of spring 24 from the drum 16, a stop 36 pivotally mounted on a pin 38 cooperates with a notch 40 in the drum 16 to prevent unwinding movement beyond the position shown in FIGURE 1. A torsion spring 42 preloaded between a pin 43 and stop 36 serves to bias the stop 36 toward contact with drum 16.

The spring motor in accordance with this invention includes a second spring means for increasing the starting torque and/or the length of run. This spring means may take the form of a power spring of various types, such as a conventional power spiral spring, a torsion spring or other suitable spring means. In the preferred form of the invention this spring means comprises a reverse wound non-cumulative force ribbon spring which is disclosed in U.S. Patent No. 2,833,534, issued May 6, 1958. This type of spring comprises a strip of spring metal stressed to form a tight coil as described in U.S. Patent No. 2,609,192 so as to assume naturally a tight coil. This tightly coiled ribbon spring known as a non-cumulative force spring is then fastened to and backwound on an arbor and the other end is connected to the inner wall of a (hollow) restraining case. When the arbor is permitted to unwind, the ribbon spring tends to assume a position coiled in contact with the inner wall of the restraining case. In order to wind the spring, the arbor is rotated so that the ribbon spring is wound onto the arbor. After a few initial turns of the arbor substantially all of the ribbon spring reaches approximately the same stress level. Spiral power springs of this type have a high starting torque, a long deflection and a substantial active length which results in a low torque gradient as is described in U.S. Patent No. 2,833,534. The high initial stress produced by forcing the spring material inside out provides the high starting torque for springs of this type. The torque-deflection curves of spiral springs of this type will be discussed hereafter.

Figure 1:
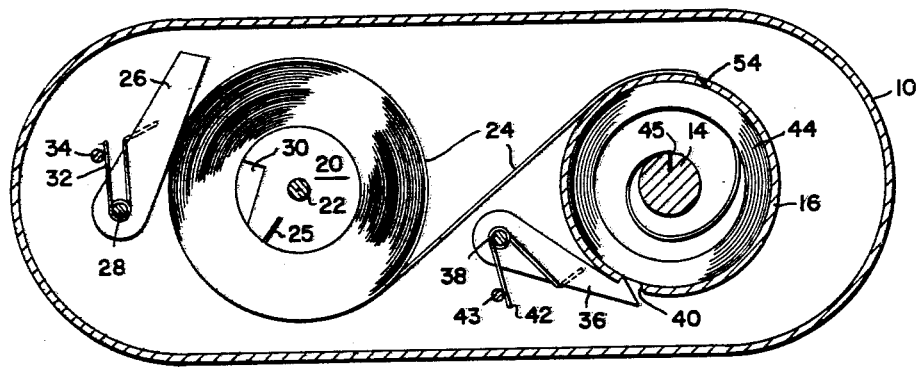
FIGURE 1 is an elevation of a spring motor in accordance with this invention in an unwound condition.
Figure 2:
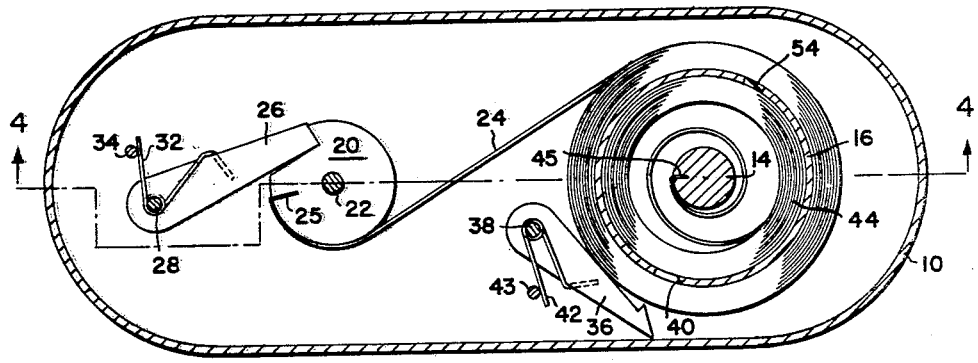
FIGURE 2 is a view similar to FIGURE 1 showing the spring motor in a partially wound condition.

Referring to the drawings, the spiral spring formed from a non-cumulative force spring and employed in the spring motor in accordance with this invention is designated at 44 and is located within drum 16. The inner end of the spring 44 is connected to the shaft 14, as by insertion into a slot 45 therein and the outer end is connected to the drum 16, as by a rivet, these elements corresponding to the arbor and restraining case, respectively, discussed above. The unwound condition of the spring 44 is illustrated in FIGURE 1.

As shown in FIGURE 4, a rectangular recess 46 is provided in one end of the shaft 14. This recess is adapted to receive a winding key or other similar instrument which is used to rotate the shaft 14 to wind the spring motor.

Generally, but not necessarily, there will be provided means for holding the spring motor in a partially or fully wound condition. This means may be a part of the motor or be encompassed in the structure driven by the motor. For example, by way of a typical illustration, a ratchet gear 48 is fixedly mounted on the portion of shaft 14 projecting from plate 12. A pawl 50 is mounted on a pin 52 for pivotal movement and cooperation with the ratchet gear 48 in a manner to prevent an unwinding movement of shaft 14 when the pawl engages the teeth of the ratchet gear 48. A torsion spring 53 is mounted on pin 52 in compression between a pin 55 and pawl 50 and serves to bias pawl 50 into engagement with ratchet gear 48. The pawl 50 may be pivoted against the bias of spring 53, as by rotation of pin 52 to a disengaged position, as desired, to permit unwinding of shaft 14.

FIGURE 5 illustrates one manner in which the ends of the springs 24 and 44 are connected to the drum 16. As shown in this figure, the spring 24 projects through an opening 54 in the drum 16 and is secured to the inner wall thereof by a rivet 56. The spring 24 is also connected to the inner wall drum 16 by a rivet 58.

Figure 6:
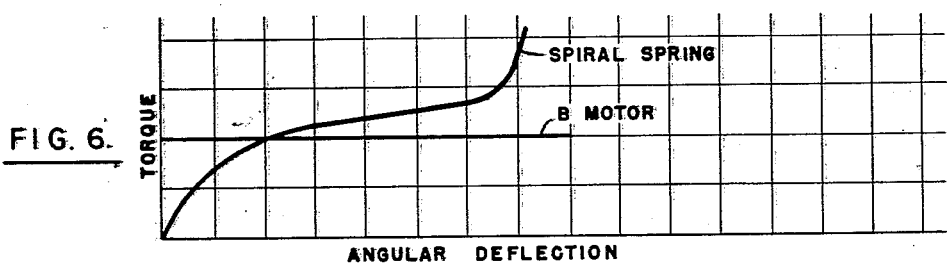
FIGURES 6 to 11 are graphs showing typical torque-deflection characteristics of spring motors and springs in accordance with this invention.

The curve shown in FIGURE 6 illustrates the torque characteristics of the B-motor and the spiral power spring employed in the spring motor in accordance with this invention. This figure is a plot of torque (or force) and angular deflection (or turns). As shown in this figure, the B-motor has a zero gradient, although, the gradient may be varied somewhat being usually slightly positive. On the other hand, the spiral power spring generally has a substantial positive gradient which can be made much lower than the usual spiral power spring if desired. In operation, the spiral power spring produces the desired high initial torque and also increases the length of run of the motor.

Figure 7:
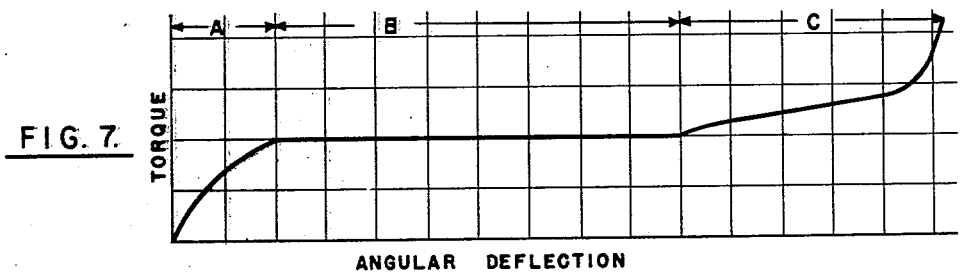

In the spring motor in accordance with this invention, the springs 24 and 44 are in effect connected in series relation with respect to the shaft 14, the springs both being connected to the drum 16. The torque-deflection curve of the spring motor as applied to the shaft 14, which may be termed the output shaft, is the combined curve of the individual springs. The torque-deflection curve for a spring motor comprising springs having characteristics as shown in FIGURE 6 is illustrated by the curve shown in FIGURE 7. The torque-deflection characteristics of the spring motor is dependent upon the relative strengths of the springs 24 and 44. Referring to FIGURES 6 and 7, during the winding of the spring motor after a relatively short deflection of the spring 44 the spring 24 will begin to wind. After the spring 24 is completely wound, continued rotation of shaft 14 will resume winding of the spiral spring 44.

Figure 8:
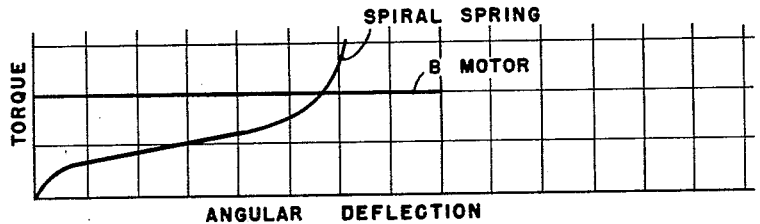
Figure 9:
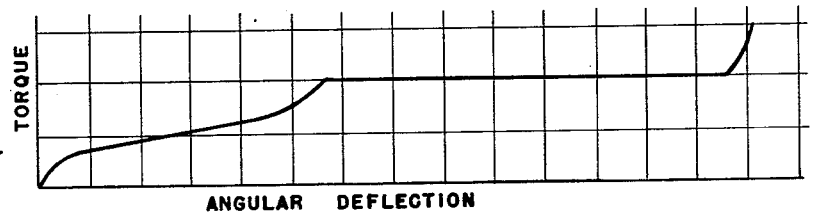

Referring to FIGURE 8 wherein the characteristics of B-motor spring 24 is assumed to be the same as the B-motor spring 24 shown in FIGURE 6 and that of spring 44 is modified to give a different gradient curve, it will be apparent that as shown in FIGURE 9 spiral spring 44 will be almost completely wound before commencement of winding of the spring 24.

Figure 10:
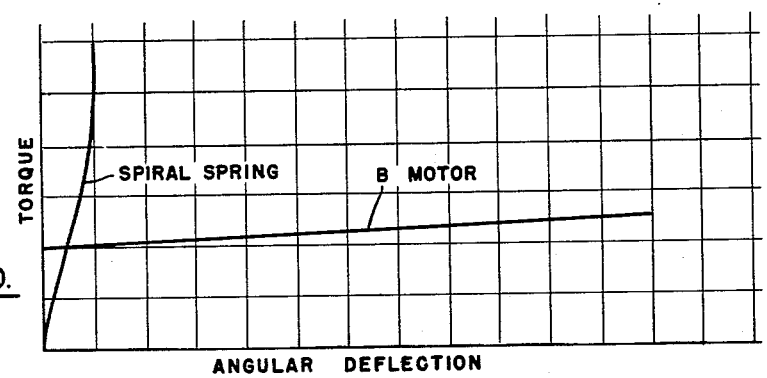
Figure 11:
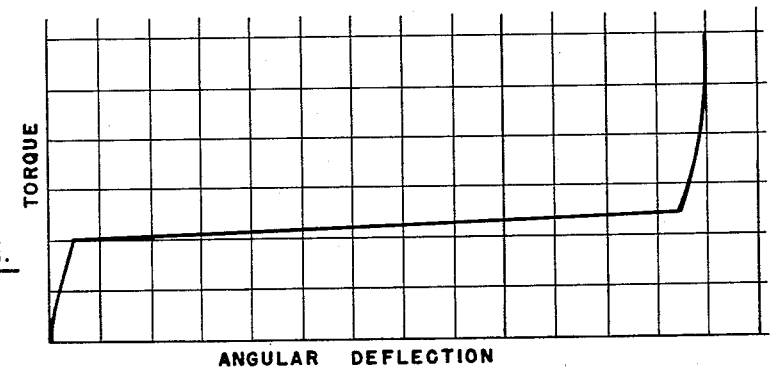

FIGURES 10 and 11 illustrate the torque-deflection characteristics of a spring motor in which the spiral spring 44 is assumed to have an uninterrupted high gradient and the spring 24 is assumed to have a low positive gradient. A spring motor of this type will have a higher starting torque but a shorter run than the previously discussed examples. FIGURES 10 and 11 also illustrate the conditions when a conventional power spring is employed in lieu of the reverse wound spring 44.

FIGURES 6 to 11 illustrate the wide variety of torque-deflection characteristics which can be obtained with a spring motor constructed in accordance with this invention. This variety may be obtained by simply changing the torque-deflection characteristics of the individual springs comprising the motor. For example, the B-motor may be made stronger than the spiral spring, in which case, during winding, the B-motor is stationary initially while the spiral spring is wound fully, with the B-motor being wound subsequently. Moreover, by reason of the construction shown in FIGURES 1 to 4, the spring motor has a large travel or operating length which is achieved in a minimum of space.

In describing the use of the spring motor shown in FIGURES 1 to 4, it will be assumed that the motor has a torque-deflection curve such as that shown in FIGURE 7. Starting from the unwound condition shown in FIGURE 1, the winding of the spring motor is effected by rotation of the shaft 14 in a clockwise direction as viewed in FIGURES 1–3. The rotation of shaft 14 may be caused by any suitable means, such as by means of a key member cooperable with the square recess 46. The stop 36 prevents any counterclockwise rotation of drum 16 from the position shown in FIGURE 1 but permits clockwise rotation thereof.

As shown in FIGURE 7, during the initial angular deflection of the spring motor, the spiral spring 44 is wound. After a small initial winding of the spiral spring 44 (this deflection portion being indicated at A in FIGURE 7), the B-motor spring 24 will begin to wind onto the drum 16. This winding will continue for an angular deflection indicated at B in FIGURE 7. At the end of this period, the spring motor is in the condition shown in FIGURE 2 with the spring 24 completely wound onto the drum 16. The stop 26 terminates the winding of the spring 24 by engagement with the notch 30 thereby preventing complete unwinding of spring 24 from the drum 20. In this position of the spring motor, it will be evident that the cooperation of drum 20, stop 26 and spring 24 prevents any further clockwise movement of the drum 16.

Figure 3:
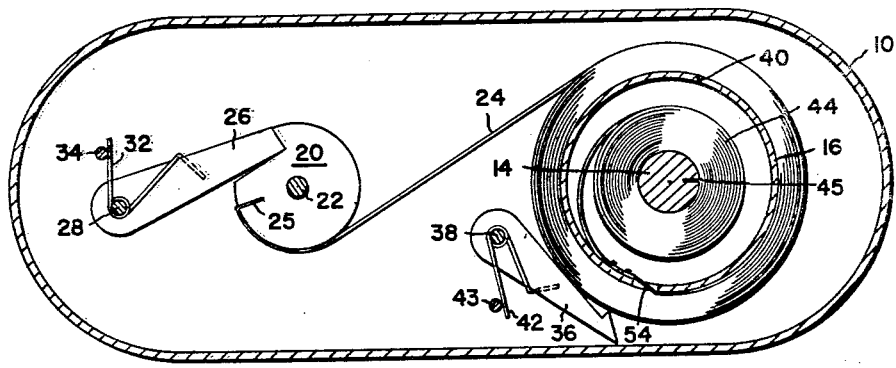
FIGURE 3 is a view similar to FIGURE 1 showing the spring motor in the fully wound condition.

Further clockwise rotation of shaft 14 causes winding of the spiral spring 44 onto the shaft 14. This winding continues for the period illustrated at C in FIGURE 7. The fully wound condition of the spring motor is shown in FIGURE 3. In this condition, the spring 44 is wound completely onto the shaft 14 and the spiral spring 24 is in the fully wound condition on the drum 16. The pawl 50 is cooperable with the ratchet gear 48 to hold the spring motor in this fully wound condition by preventing any counterclockwise movement of shaft 14 under the bias of the springs.

When it is desired to operate the motor, the pawl 50 is moved out of engagement with the ratchet gear 48 as by rotation of pin 52 thereby to permit free rotation of the shaft 14 under the bias of the spring motor. During the unwinding of the spring motor, the shaft 14 and the drum 16 are moved in a counterclockwise direction and the drum 20 is moved in a clockwise direction as viewed in FIGURES 1 to 3. During the initial stage of unwinding of the spring motor, the spring 44 unwinds to provide a high starting torque causing rotation of shaft 14. The drum 16 remains stationary during this initial stage until the torque exerted by spring 44 falls below the torque exerted by spring 24 at which time the spring 24 starts coiling on drum 20 and uncoiling from drum 16. This results in the drum 16 being rotated to cause a corresponding rotation of shaft 14, the movement of drum 16 being transmitted to shaft 14 through spring 44. As the spring 24 coils on drum 20, the relatively constant torque and the long run of this spring are applied to shaft 14. It will be appreciated that the combined effect of the springs 24 and 44 is to provide a higher starting torque combined with a longer run than could be achieved by the use of spring 24 alone. During the initial clockwise movement of the drum 20 the stop 26 is cammed out of engagement with the notch 30 and is not operative to prevent any clockwise movement of the drum 20. Also, during the unwinding of the spring motor, the stop 36 engages the notch 40 to arrest the counterclockwise movement of drum 16 in the position shown in FIGURE 1 thereby to prevent overtravel of the spring 24.

It will be apparent that the rotation of the output shaft 14 in response to the operation of the spring motor may be used in many applications where a large travel and high starting torque are desirable. Thus, the spring motor in accordance with this invention has special applications in fire alarms, cameras and the like.

It will be apparent that the construction and arrangement of parts may be varied without departing from the scope of the invention described herein wherefore it is not desired to be limited except as required by the following claims.

What is claimed is:

1. A spring motor comprising an output shaft, a tightly coiled ribbon spring, means operatively connecting said ribbon spring to said shaft so that said ribbon spring biases said shaft for rotation in one direction, a spiral ribbon spring, and means operatively connecting said spiral ribbon spring to said shaft in series relation with said ribbon spring, said spiral ribbon spring biasing said shaft in the same direction as said first mentioned ribbon spring and being stronger than said first mentioned ribbon spring for providing a high starting torque.

2. A spring motor comprising a hollow drum mounted for rotation about its axis, a shaft positioned concentrically within said drum and mounted for rotation about the common axis of said drum and said shaft, a second drum mounted for rotation about an axis spaced from said first-mentioned axis, a tightly coiled ribbon spring having one end connected to said second drum and the other end connected to said hollow drum, and a power spring mounted within said hollow drum and connected between shaft and said hollow drum, said springs being moved toward the wound condition thereof in response to rotation of said shaft in one direction, said power spring transmitting movement of said shaft to said ribbon spring through said hollow drum.

3. A spring motor comprising a hollow drum mounted for rotation about its axis, a shaft positioned concentrically within said drum and mounted for rotation about the common axis of said drum and said shaft, a second drum mounted for rotation about an axis spaced from said first-mentioned axis, a tightly coiled ribbon spring having one end connected to said second drum and the other end connected to said hollow drum, and a power spring mounted within said hollow drum and connected between said shaft and said hollow drum, said springs being moved toward the wound condition thereof in response to rotation of said shaft in one direction, said power spring transmitting movement of said shaft to said ribbon spring through said hollow drum, said power spring being stronger than said ribbon spring for providing the starting torque for the spring motor.

4. A spring motor comprising a hollow drum mounted for rotation about its axis, a shaft positioned concentrically within said drum and mounted for rotation about the common axis of said drum and said shaft, a second drum mounted for rotation about an axis spaced from said first-mentioned axis, a tightly coiled ribbon spring having one end connected to said second drum and the other end connected to said hollow drum, and a spiral spring mounted within said hollow drum and connected between said shaft and said hollow drum, said springs being moved toward a wound condition thereof in response to rotation of said shaft in one direction, said spiral spring including a coil of spring ribbon with convolutions of the coil wound opposite to the normal set of the ribbon, one end of said last-mentioned ribbon being connected to said shaft and the other end being connected to said hollow drum, said spiral spring transmitting movement of said shaft to said ribbon spring through said hollow drum.

5. A spring motor comprising a hollow drum mounted for rotation about its axis, a shaft positioned concentrically within said drum and mounted for rotation about the common axis of said drum and said shaft, a second drum mounted for rotation about an axis spaced from said first-mentioned axis, a B-motor spring means including a tightly coiled ribbon spring having one end connected to said second drum and the other end connected to said hollow drum and being normally coiled on said second drum, and a spiral spring mounted within said hollow drum and connected between said shaft and said hollow drum, said springs being moved toward a wound condition thereof in response to rotation of said shaft in one direction, said spiral spring transmitting movement of said shaft to said ribbon spring through said hollow drum.

6. A spring motor according to claim 5 including stop means limiting movement of said drums to prevent complete unwinding of said ribbon spring therefrom.

7. A spring motor comprising a hollow drum mounted for rotation about its axis, a shaft positioned concentrically within said drum and mounted for rotation about the common axis of said drum and said shaft, a second drum means mounted for rotation about an axis spaced from said first-mentioned axis, a B-motor spring means including a tightly coiled ribbon spring having one end connected to said second drum and the other end connected to said hollow drum and being normally coiled on said second drum, and a spiral spring mounted within said hollow drum and connected between said shaft and said hollow drum, said springs being moved toward a wound condition thereof in response to rotation of said shaft in one direction, said spiral spring including a coil of spring ribbon with convolutions of the coil wound opposite to the normal set of the ribbon, one end of said last-mentioned ribbon being connected to said shaft and the other end being connected to said hollow drum, said spiral spring transmitting movement of said shaft to said ribbon spring through said hollow drum.

8. A spring motor comprising a hollow drum mounted for rotation about its axis, a shaft positioned concentrically within said drum and mounted for rotation about the common axis of said drum and said shaft, a second drum means mounted for rotation about an axis spaced from said first-mentioned axis, a B-motor spring means including a tightly coiled ribbon spring having one end connected to said second drum and the other end connected to said hollow drum and being normally coiled on said second drum, and a spiral spring mounted within said hollow drum and connected between said shaft and said hollow drum, said springs being moved toward a wound condition thereof in response to rotation of said shaft in one direction, said spiral spring including a coil of spring ribbon with convolutions of the coil wound opposite to the normal set of the ribbon, one end of said last-mentioned ribbon being connected to said shaft and the other end being connected to said hollow drum, said spiral spring transmitting movement of said shaft to said ribbon spring through said hollow drum, and means for holding said shaft in a position wherein the spring motor is in a wound condition.

9. A spring motor comprising an output drum, means connected to the drum including a spring to urge the drum in one direction of rotation, a rotatably mounted output shaft and means including a spring connecting the output shaft to the drum to urge the drum in the opposite direction of rotation, the said springs being moved toward the wound condition in response to rotation of the shaft in one direction and both acting to rotate the shaft in the opposite direction on unwinding.

10. A spring motor comprising an output drum, means connected to the drum including a non-cumulative force ribbon spring to urge the drum in one direction of rotation, a rotatably mounted output shaft and means including a power spring connecting the output shaft to the drum to urge the drum in the opposite direction of rotation, the said springs being moved toward the wound condition in response to rotation of the shaft in one direction and both acting to rotate the shaft in the opposite direction on unwinding.

11. A spring motor comprising an output drum and a storage drum, a non-cumulative force ribbon spring having one end connected to the output drum and one end connected to the storage drum, a rotatably mounted output shaft having a common axis with the output drum, a second spring having means connecting one end of said second spring to the output drum and means connecting the other end of said second spring to the output shaft, said springs being moved toward the wound condition thereof in response to rotation of said shaft in one direction.

12. A spring motor comprising an output drum and a storage drum, a non-cumulative force ribbon spring having one end connected to the output drum and one end connected to the storage drum, a rotatably mounted output shaft having a common axis with the output drum, a power spring having means connecting one end of said second spring to the output drum and means connecting the other end of said second spring to the output shaft, said springs being moved toward the wound condition thereof in response to rotation of said shaft in one direction, the power spring exerting a greater force than the ribbon spring when the motor is fully wound to provide a high starting torque.

References Cited in the file of this patent
UNITED STATES PATENTS

| | | |
|---|---|---|
| 2,510,978 | Hutton | June 13, 1950 |
| 2,833,534 | Foster | May 6, 1958 |
| 2,835,344 | Allen | May 20, 1958 |
| 2,899,193 | Foster | Aug. 11, 1959 |
| 3,033,316 | Foster | May 8, 1962 |